United States Patent [19]

Acht et al.

[11] Patent Number: 4,851,772
[45] Date of Patent: Jul. 25, 1989

[54] MAGNET ASSEMBLY FOR MEASUREMENT OF DISPLACEMENT

[75] Inventors: Joachim Acht; Franz Benda, both of Frankfurt am Main, Fed. Rep. of Germany

[73] Assignee: VDO Adolf Schindling AG, Frankfurt am Main, Fed. Rep. of Germany

[21] Appl. No.: 176,841

[22] Filed: Apr. 4, 1988

[30] Foreign Application Priority Data

Apr. 25, 1987 [DE] Fed. Rep. of Germany ....... 3713880

[51] Int. Cl.$^4$ .............................................. G01B 7/14
[52] U.S. Cl. ..................................... 324/208; 324/262
[58] Field of Search ............. 324/207, 208, 228, 234, 324/235, 236, 251, 252, 260, 262; 338/32 R, 32 H

[56] References Cited

U.S. PATENT DOCUMENTS

| | | | |
|---|---|---|---|
| 3,164,013 | 1/1965 | Schmahl et al. | 324/208 X |
| 3,777,273 | 12/1973 | Baba et al. | 324/208 X |
| 4,086,533 | 4/1978 | Ricouard et al. | 324/208 |
| 4,204,158 | 5/1980 | Ricouard et al. | 324/208 |
| 4,338,823 | 7/1982 | Iwasaki | 324/208 X |
| 4,592,249 | 6/1986 | Lehmann et al. | 324/208 X |
| 4,639,665 | 1/1987 | Gary | 324/207 X |
| 4,665,362 | 5/1987 | Abel et al. | 324/208 |

FOREIGN PATENT DOCUMENTS

| | | | |
|---|---|---|---|
| 1473854 | 2/1969 | Fed. Rep. of Germany | 324/208 |
| 54-058478 | 5/1979 | Japan | 324/208 |
| 949593 | 2/1964 | United Kingdom | 324/208 |
| 1395850 | 5/1975 | United Kingdom | 324/208 |
| 86-02444 | 4/1986 | World Int. Prop. O. | 324/208 |

Primary Examiner—Reinhard J. Eisenzopf
Assistant Examiner—Warren S. Edmonds
Attorney, Agent, or Firm—Martin A. Farber

[57] ABSTRACT

A magnet assembly for measurement of displacement of a rod is formed as a ring encircling the rod. The rod is displaceable along its axis and perpendicular to a plane of the ring. The rod includes a collar for interaction with a magnetic field produced by the magnet assembly. The assembly includes a magnetic field sensor and a first permanent magnet disposed along an inner surface of the ring, which are diametrically opposed on opposite sides of the rod. Second and third permanent magnets of like polarity are also disposed along the inner surface of the ring, and symmetrically positioned relative to the first magnet.

3 Claims, 1 Drawing Sheet

MAGNET ASSEMBLY FOR MEASUREMENT OF DISPLACEMENT

FIELD AND BACKGROUND OF THE INVENTION

The invention refers to a magnet assembly for the contact-less detection of the position of an axially displaceable bar having a collar or a circumferential groove, preferably a shift rod of an automatic transmission, which magnet barrier has a magnetic field sensor directed at the rod.

Magnet barriers of this type are generally known and customary.

In the known magnet assemblies a magnet is generally attached to the rod to be monitored, so that a signal is produced when the rod is opposite a magnetic field sensor which is arranged alongside the rod. Such an arrangement has the disadvantage that the application of the magnet to the rod is expensive and the rod must be installed in a fixed alignment with respect to the magnetic field sensor and remain therein. These disadvantages can be avoided if the magnet is arranged directly on the magnetic field sensor and the shaft is provided, for instance, with a collar on which the lines of flux are concentrated when the collar is below the magnet and magnetic field sensor. Such an arrangement has the disadvantage, however, that there is a high residual field strength for the magnetic field sensor when the collar is outside the range of the magnetic field sensor. As a result, the magnet assembly operates unreliably, particularly in the assembly of large air gaps.

SUMMARY OF THE INVENTION

It is an object of the invention to develop a magnet assembly of the aforementioned type which does not require a magnet fastened on the rod to be monitored, requires no orientation of the rod, and has the largest possible difference in field strengths between different positions to be monitored.

Accordingly, by the invention the magnetic field sensor (4) is provided on the inner side of a ring (5) which provides a magnetic flux return path, and which coaxially surrounds the rod (1) and is provided on the side lying opposite the magnetic field sensor (4) with a magnet (6) which is directed towards the magnetic field sensor (4).

By this return ring a high difference in magnetic flux between the positions of the rod to be monitored is obtained even with a relatively weak magnet or a relatively large air gap, so that the magnet assembly operates well with a simple magnetic field sensor which is not very sensitive and is thus inexpensive, in particular a Hall element.

The magnet assembly operates particularly effectively if, in accordance with one advantageous embodiment of the invention, the facing magnet (6) has a crescent shape with concave surface facing the rod (1).

One embodiment of the invention which operates equally well is that the return closure ring (5) has, in addition to the magnet (6) located opposite the magnetic field sensor (4) and transverse to it, two additional magnets (7, 8) which have the same polarity as said opposite magnet (6).

A reversal of the direction of flux of the magnetic field passing through the magnetic field sensor can be obtained in simple fashion in the manner that directly alongside the magnetic field sensor (4) there is provided a deflection magnet (9, 10) whose polarity is reverse to that of the said opposite magnet (6).

In a situation, by way of example, wherein the rod (1) undergoes oscillatory motion along its axis, a particularly strong alternating magnetic field can be obtained by positioning a deflection magnet (9, 10) on each side of the magnetic field sensor.

BRIEF DESCRIPTION OF THE DRAWING

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
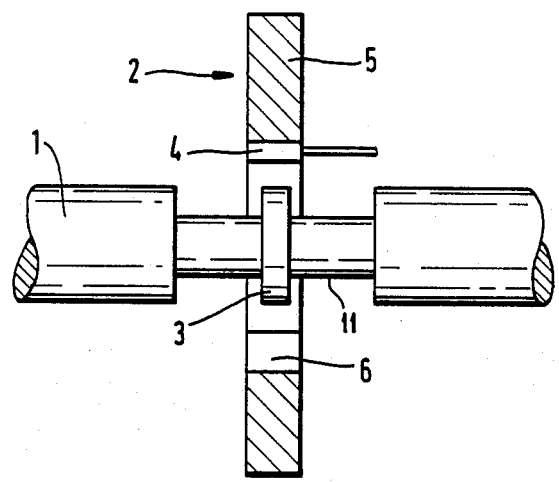
FIG. 1 is a longitudinal section showing the magnet assembly of the invention surrounding a rod.

FIG. 1 shows, in part, an axially displaceable rod 1 the position of which is to be monitored by a magnet assembly 2. For this purpose the rod 1 has a collar 3 which, in the position shown, is located in front of a magnetic field sensor 4 which is in the form of a Hall element. This magetic field sensor 4 is arranged on the inner side of a ring 5 which provides a magnetic flux return path, the ring 5 encircling the rod 1. The magnet 6 can be noted in FIG. 1 on the side opposite the magnetic field sensor 4.

Figure 2:
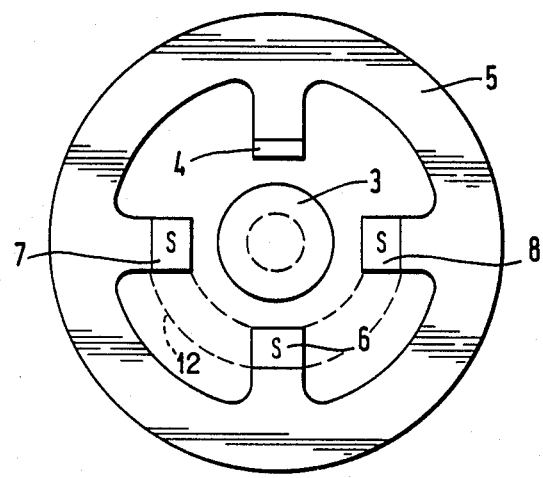
FIG. 2 is a plan view of the magnet assembly of FIG. 1.

FIG. 2 shows the shape of the magnet assembly 2 more clearly. It can be noted that, in addition to the magnet 6, there are arranged at angles of 90 degrees to it two additional magnets 7, 8 which have the same polarity as the magnet 6. Instead of these two additional magnets 7, 8, the magnet 6 can be constructed in the form of a crescent, shown in phantom at 12.

If the collar is in front of the magnets 6, 7, 8 and the magnetic field sensor 4, then the magnetic flux extends from the return closure ring 5 via the magnetic field sensor 4 into the collar 3 and from there via the magnets 6, 7, 8 back into the ring 5. If the rod 1 is shifted axially so that the collar 3 is outside the magnet assembly 2, then this magnetic flux is greatly attenuated since the distances between the magnetic field sensor 4 and the magnets 6, 7, 8 are too great for sustaining a strong field.

Figure 3:
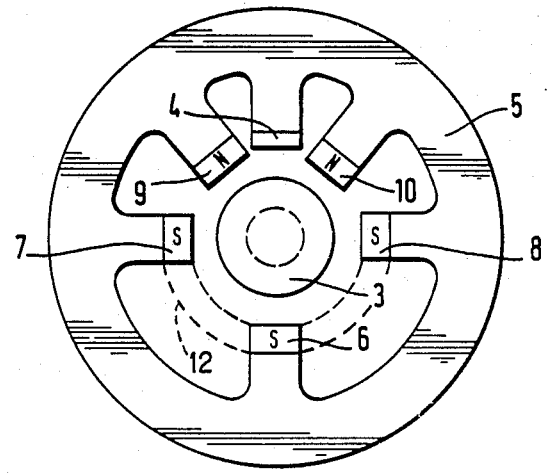
FIG. 3 is a plan view of a second embodiment of a magnet assembly according to the invention.

In the embodiment shown in FIG. 3, two deflection magnets 9, 10 are arranged alongside the magnetic field sensor 4, the deflection magnets having the opposite polarity to the magnets 6, 7, 8. If, for instance, each of the deflection magnets 9, 10 has its north pole radially inward then there is a magnetic flux from these north poles of the deflection magnets 9, 10 to the magnetic field sensor 4 and from there, via the ring 5, to the deflection magnets 9, 10. The magnetic field sensor 4 is therefore traversed from the bottom to the top as seen in the drawing. If the collar 3 is within the magnet assembly, as is shown in FIG. 3, then the main flow takes place from the magnetic field sensor 4 via the collar 3 to the magnets 6, 7, 8 and therefore in precisely the opposite direction. There is thus a reversal of the direction of flow. The collar 3 is set within a circumferential groove 11 of rod 1.

We claim:

1. In a magnet assembly for the contactless detection of the position of a rod axially displaceable along an axis of the assembly, the rod having a collar or a circumferential groove, the magnet assembly having a magnetic field sensor directed at the rod, the improvement wherein the assembly is formed as a ring providing a path for magnetic flux, the ring having an inner surface which coaxially surrounds the rod, the magnetic field sensor being disposed on the inner surface of the ring, there being a first magnet disposed on the inner surface of the ring diametrically opposite the magnetic field sensor; the assembly further comprising a second magnet and a third magnet which are disposed on the inner surface of the ring diametrically opposite each other, and are located symmetrically about the magnetic field sensor, the second and third magnets having the same polarity as the first magnet.

2. A magnet assembly according to claim 1, wherein the first, the second and the third magnets are formed as a unitary magnet having the shape of a crescent with an inner concave surface facing the rod.

3. A magnet assembly according to claim 1, further comprising a fourth magnet and a fifth magnet, the fourth and fifth magnets serving as deflection magnets, and being disposed on opposite sides of the magnetic field sensor, each said deflection magnet having a polarity, which is opposite that of the first magnet.

* * * * *